US012397328B2

(12) United States Patent
Iriyama et al.

(10) Patent No.: US 12,397,328 B2
(45) Date of Patent: Aug. 26, 2025

(54) DIE-CLEANING ATTACHMENT FOR WORKPIECE TRANSFER STRUCTURE

(71) Applicant: Toyota Motor Engineering & Manufacturing North America, Inc., Plano, TX (US)

(72) Inventors: Tadashi Iriyama, Oakville (CA); Addi Rene Pump, Paris (CA); Kerry S. Moniz, Dorchester (CA)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 313 days.

(21) Appl. No.: 18/103,976

(22) Filed: Jan. 31, 2023

(65) Prior Publication Data

US 2024/0253088 A1 Aug. 1, 2024

(51) Int. Cl.
*B08B 5/02* (2006.01)
*B08B 13/00* (2006.01)
*B21D 22/02* (2006.01)

(52) U.S. Cl.
CPC ................ *B08B 5/02* (2013.01); *B08B 13/00* (2013.01); *B21D 22/02* (2013.01)

(58) Field of Classification Search
CPC ............ B08B 5/02; B08B 13/00; B21D 22/02
See application file for complete search history.

(56) References Cited

U.S. PATENT DOCUMENTS

2012/0216369 A1* 8/2012 Vinci ........................ B08B 5/02 15/405

FOREIGN PATENT DOCUMENTS

| | | | | |
|---|---|---|---|---|
| CN | 111687273 A | * | 9/2020 | ............. B08B 1/002 |
| CN | 212525666 U | | 2/2021 | |
| CN | 216965625 U | | 7/2022 | |

OTHER PUBLICATIONS

Idromatic. "Cleaning Dies and Molds With Steam and Compressed Air", Retrieved from the Internet: <https://www.youtube.com/watch?v=TsHqy3GebAw>, retrieved Sep. 10, 2022.

* cited by examiner

*Primary Examiner* — Michael E Barr
*Assistant Examiner* — Lauren G Orta
(74) *Attorney, Agent, or Firm* — Christopher G. Darrow; Darrow Mustafa PC

(57) ABSTRACT

A die cavity cleaning element includes a plurality of air discharge openings spaced apart along the cleaning element. A shape of at least a portion of the cleaning element including the air discharge openings is structured to conform to a shape of a predetermined portion of a lower die cavity of a stamping die. The cleaning element is operable to direct a flow of pressurized air through each of the air discharge openings onto an associated part of the predetermined portion of a lower die cavity. Collectively, the pressurized airflows expel debris from the predetermined portion of a lower die cavity.

13 Claims, 4 Drawing Sheets

DIE-CLEANING ATTACHMENT FOR WORKPIECE TRANSFER STRUCTURE

TECHNICAL FIELD

The subject matter described herein relates to the cleaning of manufacturing process tooling and, more particularly, to the automated removal of stamping process debris from selected portions of a stamping die.

BACKGROUND

During stamping operations, debris such as metallic filings, shavings and/or other fragments of workpiece material may detach from the workpiece and remain in the die after the finished workpiece is extracted from the lower die. This debris may accumulate in certain portions of the die cavity during repeated operation of the die and, if not removed, may be pressed into the body of a workpiece during a stamping operation. This may cause defects in part appearance and/or other quality problems. The defective stamped part must then be reworked offline or scrapped, causing delays and added expense in the production process. In addition, when such debris accumulates in certain portions of the die cavity, stamping operations must be halted while the die cavity is cleaned manually. Manual cleaning of the die cavity is time-consuming and difficult.

SUMMARY

In one aspect of the embodiments described herein, a die cavity cleaning element is provided. The cleaning element includes a plurality of air discharge openings spaced apart along the cleaning element. The cleaning element is structured so that a central axis of each air discharge opening extends perpendicular to an exterior surface of the cleaning element.

In another aspect of the embodiments described herein, a system structured for performing a stamping process on a workpiece is provided. the system includes a lower die and a die cavity cleaning element. The lower die has a lower die cavity formed therein. The die cavity cleaning element includes a plurality of air discharge openings spaced apart along the cleaning element. A shape of at least a portion of the cleaning element is structured to conform to a shape of a predetermined portion of the lower die cavity.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
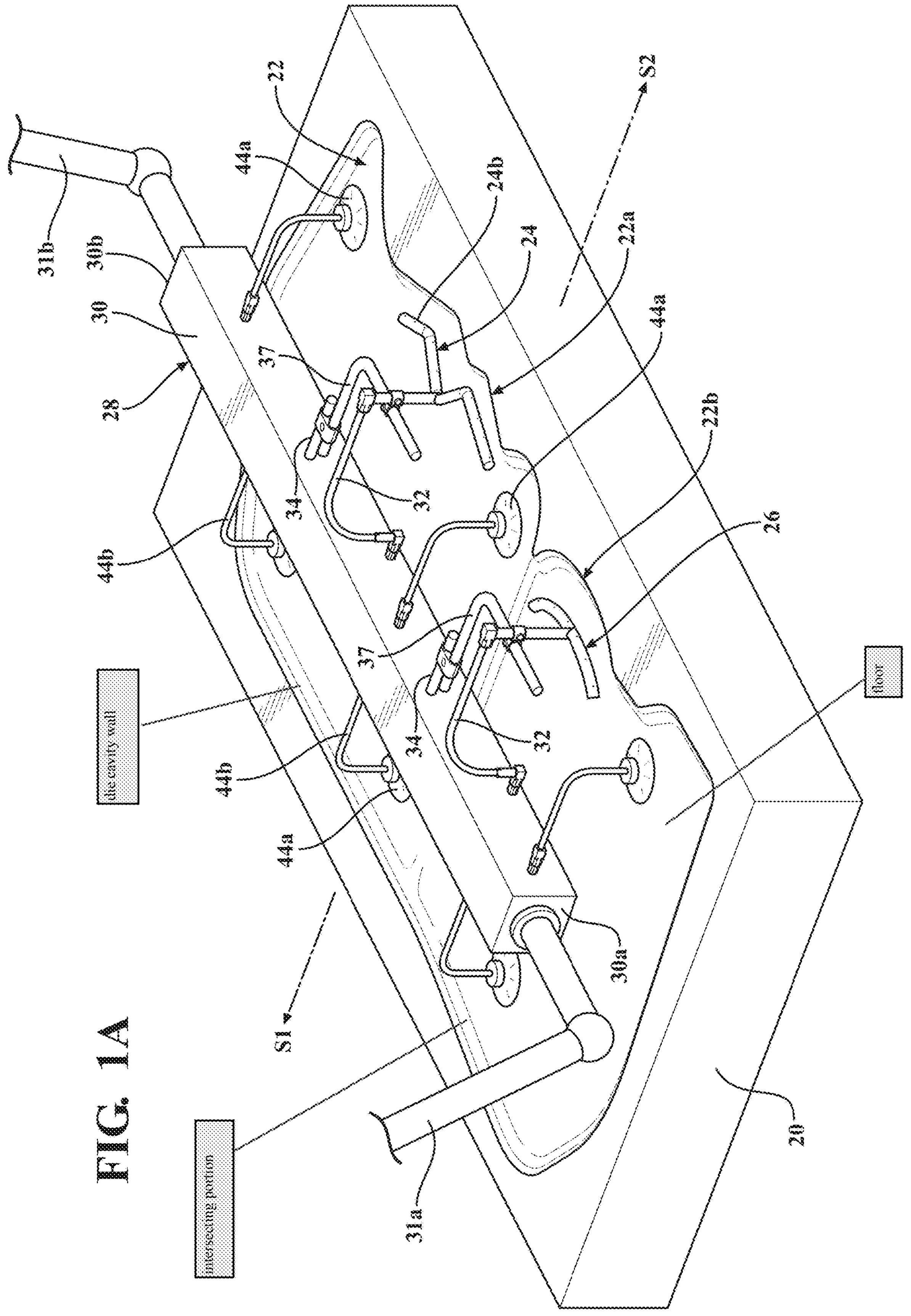
FIG. 1A is a schematic perspective view of a lower portion (or lower die) of a stamping die positioned at a die station, with a workpiece transfer structure in accordance with an embodiment described herein suspended above the lower die.

This disclosure teaches a cleaning element structured for removing debris from a die from cavity of a stamping die. The cleaning element may be mounted on a workpiece transfer structure adapted to move a workpiece into position on the die for a stamping operation. A shape of at least a portion of the cleaning element is structured to conform to a shape of a predetermined portion of the lower die cavity. In one or more arrangements, the predetermined portion of the lower die cavity may be a portion of the cavity which accumulates debris (such as metal filings) over repeated stamping operations. The cleaning element may include a plurality of air discharge openings spaced apart along the portion of the cleaning element that is shaped to conform to the predetermined portion of the lower die cavity. The cleaning element may be structured to discharge a pressurized airflow through each air discharge opening and onto an associated area of the predetermined portion of the lower die cavity. The conformal shape of the cleaning element facilitates thorough cleaning of the problematic portion of the die cavity, by ensuring a flow of pressurized air into each area of the problematic portion. In combination, the lower die and the cleaning element shaped to conform to a portion of a cavity of the lower die may form part of a system structured to perform a stamping process on a workpiece.

In this description, uses of “front,” “forward,” and the like, and uses of “rear.” “rearward,” and the like, refer to the longitudinal directions of the vehicle. “Front.” “forward,” and the like refer to the front (fore) of the vehicle, while “rear,” “rearward,” and the like refer to the back (aft) of the vehicle. Uses of “inner,” “outer,” and the like refer to the lateral directions of the vehicle. Uses of “above.” “upper,” “upward,” “below.” “lower,” “downward,” and the like refer to the vertical directions of the vehicle.

It will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 1B:
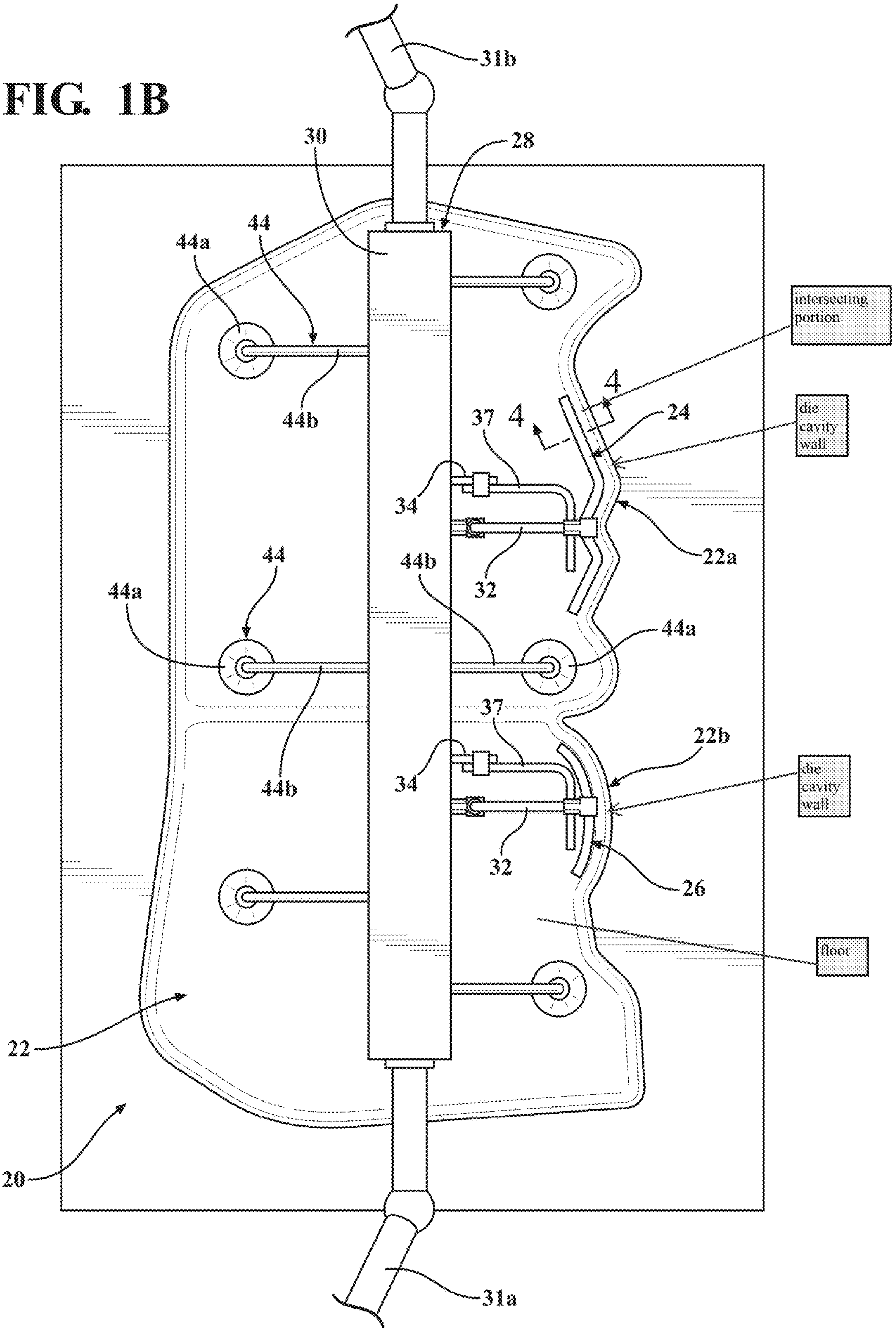
FIG. 1B is a schematic plan view of the lower die and workpiece transfer structure of FIG. 1A.

FIG. 1A is a schematic perspective view of a lower die portion (or “lower die”) 20 of a stamping die positioned at a die station. FIG. 1B is a plan view of the lower die of FIG. 1A. As used herein, the term “stamping” encompasses a variety of sheet metal forming manufacturing processes, such as punching using a machine press or stamping press, blanking, embossing, bending, flanging, coining, and other operations usable for transforming a workpiece made of metal or a similarly workable material into a final shape. As known in the pertinent art, a complementary upper die portion (or “upper die”) may incorporate punches and other surfaces operable to form a workpiece into a desired shape when the upper die presses portions of the workpiece into a cavity 22 formed in the lower die. In FIGS. 1A and 1B, the upper die of the stamping die has been omitted for clarity.

One or more die cavities may be formed in the lower die 20. Lower die 20 of FIGS. 1A and 1B has a single die cavity 22. As known in the pertinent art, the die cavity 22 is a recess formed in the lower die 20 and into which at least a portion of the workpiece is deformed by direct or indirect contact with an upper die moving toward the lower die 20 when the workpiece is positioned over (or inside) the die cavity 22. The upper and lower portions of the stamping die may be mounted in a suitable stamping press. With the upper and lower dies separated, a workpiece (e.g., a large sheet metal blank) (not shown) may be positioned so as to overlie (or reside in) the die cavity 22. The upper die may then be moved into contact with the workpiece to press portions of the workpiece into the lower die cavity 22, thereby forming the workpiece into a desired shape in a known manner.

During stamping operations, debris such as filings, shavings and/or other fragments of workpiece material may detach from the workpiece and remain in the die after the finished workpiece is extracted from the lower die. This debris may accumulate in certain portions (herein referred to as "problematic portions" of the die cavity) during repeated operation of the die and, if not removed, may be pressed into the body of a workpiece during a stamping operation. This may cause defects in part appearance and/or other quality problems. The defective stamped part must then be reworked offline or scrapped, causing delays and added expense in the production process.

With a view to removing stamping debris from the die cavity 22 before part quality is adversely affected, FIGS. 1A and 1B also show embodiments 24 and 26 of a die cavity cleaning element structured to be adjustably positionable to direct a pressurized airflow onto at least one predetermined problematic portion of the die cavity 22, to remove debris from the predetermined portion of the die cavity. For simplicity, the following description will be directed primarily to cleaning element 24 as shown. It will be understood that the basic structure and operation of cleaning element 26 may be the same as the structure and operation of cleaning element 24, except that the shape of cleaning element 26 may be different so as to conform to the shape of a different portion of the die cavity.

In one or more arrangements, the cleaning element 24 may be fabricated from a hollow pipe or tube formed from a rigid material (e.g., a metal or a suitable polymer) and defining an interior 24*a* (FIG. 3) structured to facilitate a flow of pressurized air therealong. The rigidity of the cleaning element material may enable the shape of the cleaning element 24 to be maintained during use, to aid in achieving and maintaining the desired spacing between the cleaning element air discharge openings and an associated portion of the die cavity to be cleaned.

Referring to FIGS. 1A and 1B, a shape of at least a portion of each cleaning element may be structured to follow or conform to the shape of a predetermined portion of the die cavity. For example, FIGS. 1A and 1B show a first cleaning element 24 structured to conform to a shape of an associated predetermined first portion 22*a* of the die cavity 22, and a second cleaning element 26 structured to conform to a shape of an associated predetermined second portion 22*b* of the die cavity. The first and second portions 22*a*, 22*b* of the die cavity 22 may be areas determined to be problematic with regard to accumulation and/or retention of debris during stamping operations.

Figure 2:
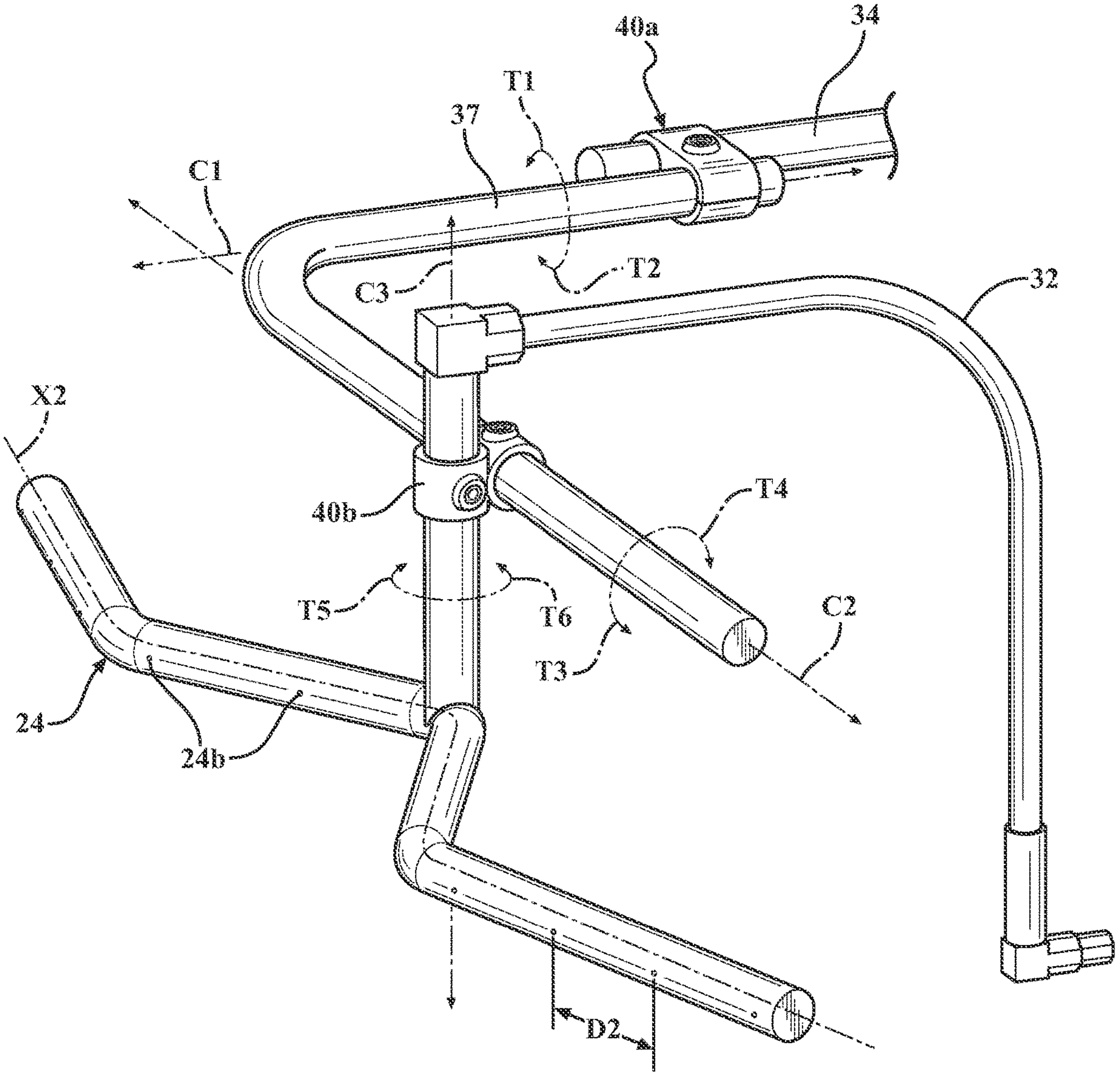
FIG. 2 is a schematic perspective view of one example of a clamping arrangement structured to enable a cleaning element to be positioned and secured in a wide range of spatial locations.
Figure 3:
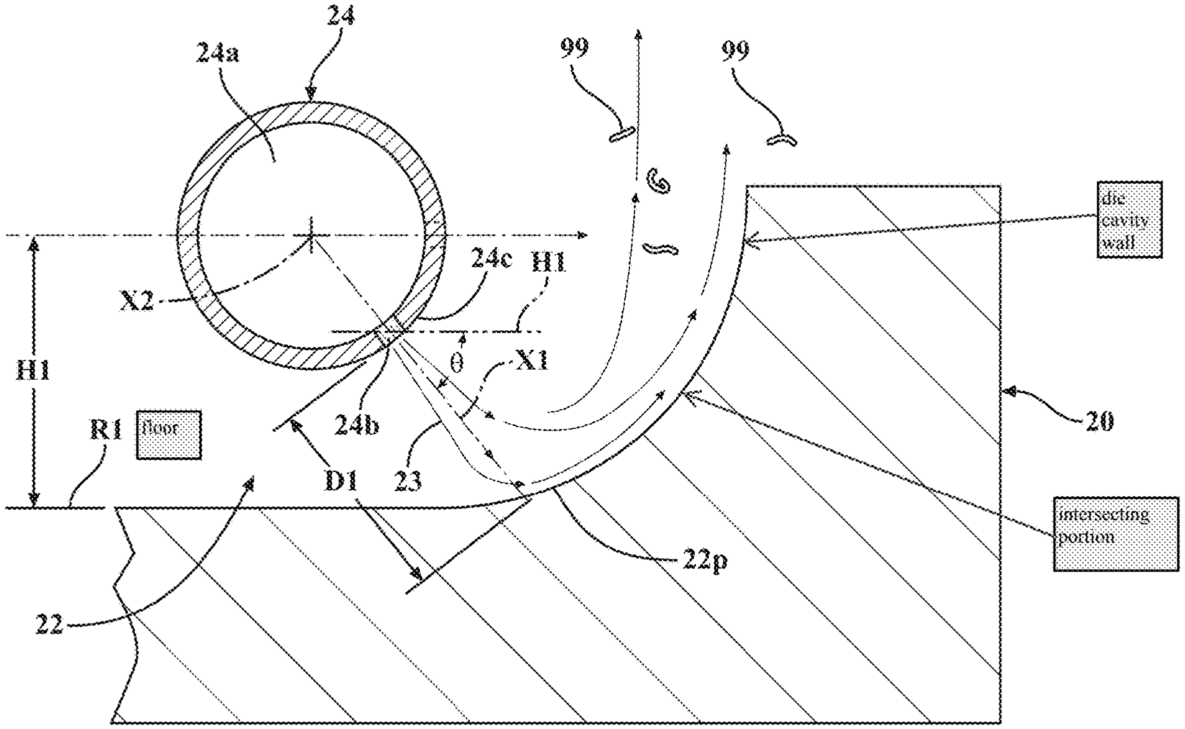
FIG. 3 is a schematic cross-sectional view of a portion of a cleaning element in accordance with an embodiment described herein, showing the cleaning element in its cleaning position and in operation for cleaning debris from a portion of a die cavity.

Referring to FIGS. 1A, 2, and 3, in one or more arrangements, the cleaning element 24 may also include a plurality of air discharge openings 24*b* spaced apart along portions of the cleaning element. The air discharge openings 24*b* may be structured to enable fluid communication between the cleaning element interior 24*a* and an exterior of the cleaning element. The cleaning element 24 may be structured to be positionable in a cleaning position with respect to the die cavity 22. When in the cleaning position, due to the overall shape of the cleaning element 24, a distance D1 from each air discharge opening 24*b* to a predetermined surface 22*p* located inside the lower die cavity 22 and along a central axis X1 of the air discharge opening 24*b* opposite the opening may be the same (within specified tolerance limits) for each air discharge opening. The predetermined die cavity surface 22*p* opposite the air discharge opening(s) 24*b* may correspond to the problematic portions of the die cavity 22. In one or more arrangements, the distance D1 may be 1±0.5 inches. Thus, for example, the distance from each air discharge opening 24*b* to a portion of the die cavity residing opposite the opening along a respective central axis of the opening may be 1±0.5 inches. Other distances are also possible.

Referring to FIG. 3, in particular embodiments, each air discharge opening 24*b* may be structured so that a central axis X1 of the opening extends perpendicular to an outer surface 24*c* of the cleaning element 24 at the location of the opening 24*b*. In embodiments of the cleaning element having a circular or cylindrical cross-section through a central axis X2 of the cleaning element, the central axis X1 of the opening 24*b* may intersect the central axis X2 of the cleaning element 24.

In one or more arrangements, the cleaning element 24 is structured so that the air discharge openings 24*b* are evenly spaced apart along the cleaning element. In particular arrangements, the air discharge openings 24*b* are spaced apart a distance D2 in the range of 1.3±0.3 inches.

In one or more arrangements, the cleaning element 24 is structured so that the air discharge openings 24*b* have equal sizes. In particular arrangements, the air discharge openings 24*b* are circular with diameters of 1 millimeter±0.3 millimeter.

Referring to FIG. 3, to help clear debris 99 from a problematic portion of the die cavity, the cleaning element 24 may be structured so that each air discharge opening 24*b* of the cleaning element directs an associated pressurized airflow 23 therethrough at a non-zero angle θ (i.e., at an "air discharge angle") with respect to a horizontal plane H1 extending through the opening 24*b*.

Referring again to FIGS. 1A and 1B, to move a workpiece to and from the die and between successive die stations and to enable adjustable positioning of the cleaning element(s) 24, 26 with respect to the die cavity for cleaning operations, a workpiece transfer structure (generally designated 28) may be employed. The workpiece transfer structure 28 may be structured to be movable with respect to the lower die 20 and to adjustably support the cleaning elements 24, 26 in respective cleaning positions of the cleaning elements. The term "adjustably support" refers to an ability of the workpiece transfer structure 28 to enable air discharge angles θ of any cleaning element and spatial positions of the cleaning elements 24, 26 with respect to the die cavity 22 to be adjusted according to the requirements of a particular application, and also to enable a height H1 of the cleaning member above a reference surface to be adjusted as needed.

In one or more arrangements, workpiece transfer structure 28 may include a cross-bar 30 structured to be movable with respect to the lower die 20. The cross-bar 30 may be hollow to enable air supply lines, vacuum lines, electrical and/or mechanical control cables, and other elements of the workpiece transfer structure to be incorporated into the interior of the cross-bar 30. Alternatively, one or more of the elements (or portions of the elements) supported by the cross-bar 30 may be mounted along an exterior of the cross-bar. For example, FIGS. 1A and 1B show portions of air supply lines 32 for the cleaning elements 24, 26 described herein, extending from the cross-bar 30 along the cross-bar exterior.

Referring to FIGS. 1A and 1B, opposite ends 30*a*, 30*b* of the cross-bar 30 may be attached to one or more automated mechanism(s) (not shown) configured to position the workpiece at a desired location on the lower die 20 for stamping. For example, in one or more arrangements, each end of the cross-bar 30 may be operably connected to one of associated programmable robotic arms 31*a*, 31*b*. The term "operably connected," as used throughout this description, can include direct or indirect connections, including connections without direct physical contact. The robotic arms 31*a*, 31*b* may operate in a coordinated fashion to move the cross-bar 30 and an attached workpiece in directions S1, S2 with respect to the lower die 20.

Referring to FIGS. 1A and 1B, to support the cleaning element 24 on the cross-bar 30, one or more support stalk(s) 34 may extend from the cross-bar 30. In one or more arrangements, to enable positioning of cleaning elements 24, 26 in their respective cleaning positions, the support stalk(s) 34 and any other members supporting the cleaning elements 24, 26 may be configured (or configurable) so that the cleaning elements will automatically reside in their respective cleaning positions when the workpiece transfer structure 28 is moved to a position needed to place a blank workpiece in the die cavity 22. Thus, in this configuration, the cleaning elements 24, 26 will be ready to perform a cleaning operation when the workpiece transfer structure 28 (without a workpiece attached) is moved into its normal position for placement of a workpiece into the lower die cavity 22.

Referring to FIG. 3, in other arrangements, the support stalk(s) 34 and any other members supporting the cleaning elements 24, 26 may be configured (or configurable) so that the cleaning elements will automatically reside at locations above their respective cleaning positions when the workpiece transfer structure 28 is moved (without a workpiece attached) to a position needed to place a blank workpiece in the die cavity 22. Thus, in these other arrangements, the cleaning elements 24, 26 may need to be lowered vertically into the lower die cavity 22 (or deeper into the lower die cavity) to reach their respective desired cleaning positions. Thus, in certain arrangements, the cleaning elements 24, 26 may be mounted to the workpiece transfer structure 28 so as to enable a height H1 of the cleaning member above a reference surface to be adjusted by moving the workpiece transfer structure 28. In particular arrangements, the reference surface may be a floor surface (not shown) of a manufacturing facility in which the die station is positioned. In other arrangements, the reference surface may be a floor or lowermost surface R1 of the die cavity 22. Other reference surfaces are also possible. To control the relative heights of the cleaning elements 24, 26, the robotic arm(s) 31*a*, 31*b* controlling movement of the workpiece transfer structure 28 may be programmable and operable to raise and lower the workpiece transfer structure 28 by desired amounts according to whether a cleaning operation or a workpiece placement operation is being performed.

Other mechanisms may also be employed to enable "fine-tuning" adjustments to the positions of the cleaning elements, in order to achieve a desired cleaning position where the air discharge openings of the cleaning elements will expel pressurized air onto problematic portions of the die cavity. For example, with reference to FIGS. 2 and 3, the cleaning element 24 may be mounted to the workpiece transfer structure 28 so as to be rotatable with respect to the workpiece transfer structure. In particular arrangements, the cleaning element 24 may be mounted on the workpiece transfer structure 28 so as to enable an air discharge angle θ of at least one air discharge opening 24*b* to be adjusted.

FIG. 2 shows one example of a clamping arrangement structured to enable the cleaning element 24 to be positioned and secured in a wide range of spatial locations. In some embodiments, the clamping arrangement may include a clamp 40*a* adjustably connecting a cleaning element support stalk 34 with a stalk extension 37 to enable translational adjustment of the cleaning element 24 along an axis C1 and rotational adjustment of the cleaning element 24 about axis C1 in directions T1 and T2.

In some embodiments, the clamping arrangement may also include a dual clamp 40*b* adjustably connecting the stalk extension 37 with the cleaning element 24. The dual clamp 40*b* may enable translational adjustment of the cleaning element 24 along an axis C2 and rotational adjustment of the cleaning element 24 about axis C2 in directions T3 and T4. In some arrangements, axis C2 may be perpendicular to axis C1. The dual clamp may also enable translational adjustment of the cleaning element 24 along another axis C3 and rotational adjustment of the cleaning element 24 about axis C3 in directions T5 and T6. In some arrangements, axis C3 may be perpendicular to axis C2. Other clamping arrangements are also possible.

The flexibility provided by the possible clamping arrangements may enable fine-tuning of the position of the cleaning element 24 when mounted on the cross-bar 30, to help achieve a desired optimum cleaning position of the cleaning element. Mechanisms other than clamps may also be employed to enable "fine-tuning" adjustments to the positions of the cleaning elements.

All of the cleaning elements mounted on the workpiece transfer structure 28 may be connected in parallel with the pressurized air supply controlled by one or more valves so that air can be supplied to all cleaning elements simultaneously. By this system, all problematic portions of the lower die 20 may be cleaned simultaneously during a cleaning operation.

Referring again to FIGS. 1A and 1B, for transporting a workpiece between die stations (or to and from a die station), the workpiece transfer structure 28 may include suction element(s) 44 structured to be operable to releasably secure the workpiece to the workpiece transfer structure so as to enable movement of the workpiece by moving the cross-bar 30. The suction elements 44 may include associated suction cups 44*a*, with each cup being structured to maintain a vacuum between the cup and the workpiece in a known manner, thereby securing a portion of the workpiece to the cup. For purposes of applying a vacuum to each cup 44*a* after the cup has been brought into contact with the workpiece, each suction element 44 may include an associated hollow attachment stalk 44*b* in gas-tight fluid communication with a surface of the cup facing the workpiece. The hollow portion of the stalk 44*b* may also be in gas-tight fluid communication with vacuum tubing or piping (not shown) fluidly communicating with an associated vacuum generation mechanism (not shown). The suction element(s) 44 are structured to releasably secure the workpiece to the workpiece transfer structure in that, when the suction element(s)

44 are brought into contact with suitable surfaces of the workpiece and a vacuum is applied to the suction element(s) 44, the suction element(s) 44 will attach or secure to the workpiece in a known manner. When the vacuum is removed from the suction element(s) 44, the workpiece will be released from attachment to the suction element(s) 44.

The positions and configurations of the suction elements 44 may be specified according to the geometry of each particular workpiece, to conform to the portions of the workpiece suitable for adhering to the vacuum cups 44*a*. For example, the configurations of the attachment stalks 44*b* and the locations on the cross-bar 30 from which the attachment stalks 44*b* extend may be tailored so that the vacuum cups 44*a* contact relatively flat, gently-curved and/or other surfaces of the workpiece amenable to vacuum attachment, to enable the workpiece to be securely "gripped" by the workpiece transfer assembly for transport.

In addition, the configurations of the cleaning element support stalks 34 (and other elements support the cleaning elements) may be tailored to the geometries of the suction cup attachment stalks 44*b*, to enable the cleaning element support stalks 34 to remain mounted on the cross-bar 30 along with the suction element attachment stalks 44*b*. This enables a cleaning operation to be performed at any desired time, by positioning the workpiece transfer structure 28 over the die cavity 22 without a workpiece attached so that the cleaning elements 24, 26 reside in their respective cleaning positions. Pressurized air may then be directed through the cleaning elements 24, 26 to clean the die cavity 22.

All of the suction elements 44 may be connected in parallel with the suction controlled by one or more valves so that a vacuum can be applied and maintained in all suction elements simultaneously to secure the workpiece to the workpiece transfer structure 28. By this system, air may also be admitted to all of the suction elements 44 at once, thereby eliminating the localized vacuums and releasing the workpiece from the workpiece transfer structure 28.

Referring again to FIG. 3, during a cleaning operation, a valve may be operated to enable pressurized air to flow along the cross-bar 30, through air supply line(s) 32, then into the cleaning elements 24, 26. The pressurized air is then expelled through the cleaning element air discharge openings and onto the problematic portions of the die cavity 22 to expel debris from the die cavity. The air supply may then be stopped, and stamping operations may be resumed by operating the suction elements 44 to affix another workpiece to the workpiece transfer structure 28.

As described herein, each of die cavity cleaning elements 24, 26 may be custom-designed to conform to the shape of a particular portion of the die cavity 22, and to include the characteristics just described. The overall shape of a cleaning element, the distribution of the air discharge openings along the cleaning element, and the spacing of the air discharge openings from the problematic areas of the die cavity may help evenly distribute the pressurized airflow to a given problematic area and ensure that a problematic area of the die cavity receives pressurized air streams sufficient to eject accumulated debris.

Optimum discharge angles θ of the air discharge openings and cleaning position parameters such as optimum distances of the air discharge openings from particular problematic surfaces of a given die cavity may be determined iteratively, through experimentation. A suitable cleaning element may then be tailored specifically for a given set of particular problematic surfaces or problematic portion of the die cavity.

In addition, die cavity cleaning operations may be automated and incorporated into normal stamping operations as needed. For example, if it is determined that debris must be removed from portions of the die cavity at least every 30 cycles of the stamping die, automated operation of the workpiece transfer structure may be programmed to bypass attachment of the transfer structure to a new workpiece for processing and, instead, to move the cross-bar (without a workpiece attached) so as to place the cleaning element(s) in their respective cleaning positions over (or inside) the die cavity. Pressurized air may then be directed through the air discharge openings to expel debris from the portion(s) of the die cavity conforming to the shape(s) of the cleaning element(s).

Operation of the workpiece transfer structure may also be programmed to automatically resume the process flow after the cleaning operation, by automatically releasably securing a new workpiece to the transfer structure and moving the workpiece into position on the lower die for stamping operation. In this manner, any required cleaning operations may be automated and incorporated into the process flow, without interruption or human involvement.

Also, by using multiple cleaning elements mounted on the workpiece transfer structure and with each cleaning element conforming to an associated problematic portion of the die cavity, the structures described herein enable each problematic portion of the die cavity to be cleaned simultaneously with all other problematic portions of the die cavity.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-3, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A workpiece transfer structure structured for positioning a workpiece in a stamping die, the workpiece transfer structure comprising:

a cross-bar structured to be movable with respect to the stamping die;

at least one suction element structured to be operable to releasably secure the workpiece to the cross-bar so as to enable movement of the workpiece by moving the cross-bar; and a die cavity cleaning element including a plurality of air discharge openings spaced apart along the cleaning element, the cleaning element being structured so that a central axis of each air discharge opening extends perpendicular to an exterior surface of the cleaning element.

2. The cleaning element of claim 1, structured so that a central axis of each air discharge opening intersects a central axis of the cleaning element.

3. The cleaning element of claim 1, structured so that the openings of the plurality of air discharge openings are evenly spaced apart along the cleaning element.

4. The cleaning element of claim 1, wherein a shape of at least a portion of the cleaning element is structured to conform to a shape of a predetermined portion of an associated die cavity of a stamping die.

5. The workpiece transfer structure of claim 1, further comprising:

a support stalk extending from the cross-bar; and at least one clamp mounted on the support stalk and structured to adjustably support the cleaning element on the support stalk.

6. A system structured for performing a stamping process on a workpiece, the system comprising:

a lower die having a lower die cavity formed therein; and a die cavity cleaning element including a plurality of air discharge openings spaced apart along the cleaning element, the cleaning element being positionable in a cleaning position with respect to the die cavity, in which a distance from each air discharge opening to a predetermined surface located inside the lower die cavity and along an axis of the air discharge opening is equal, a shape of at least a portion of the cleaning element being structured to conform to a shape of a predetermined portion of the lower die cavity; and a workpiece transfer structure structured to be movable with respect to the lower die and to adjustably support the cleaning element in the cleaning position.

7. The system of claim 6, wherein the cleaning element is structured so that a central axis of each air discharge opening extends perpendicular to an exterior surface of the cleaning element.

8. The system of claim 6, wherein the cleaning element is structured so that a central axis of each air discharge opening intersects a central axis of the cleaning element.

9. The system of claim 6, wherein the cleaning element is structured so that the openings of the plurality of air discharge openings are evenly spaced apart along the cleaning element.

10. The system of claim 6, wherein the cleaning element is mounted on the workpiece transfer structure so as to enable an air discharge angle of at least one air discharge opening of the cleaning element to be adjusted.

11. The system of claim 10, wherein the workpiece transfer structure includes:

a cross-bar structured to be movable with respect to the lower die;

a support stalk extending from the cross-bar; and at least one clamp mounted on the support stalk and structured to adjustably support the cleaning element on the support stalk.

12. The system of claim 10, wherein the workpiece transfer structure includes at least one suction element structured to be operable to releasably secure the workpiece to the workpiece transfer structure so as to enable movement of the workpiece by moving the workpiece transfer structure.

13. The system of claim 10, wherein the cleaning element is mounted to the workpiece transfer structure so as to enable a height of the cleaning element above a reference surface to be adjusted by moving the workpiece transfer structure.

* * * * *